(12) United States Patent
Mandai et al.

(10) Patent No.: US 7,046,451 B2
(45) Date of Patent: May 16, 2006

(54) IMMERSION MICROSCOPE OBJECTIVE LENS

(75) Inventors: Miwako Mandai, Yokohama (JP); Kotaro Yamaguchi, Kamakura (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/248,138

(22) Filed: Oct. 13, 2005

(65) Prior Publication Data

US 2006/0082896 A1    Apr. 20, 2006

(30) Foreign Application Priority Data

Oct. 18, 2004    (JP)    .............................. 2004-303219

(51) Int. Cl.
*G02B 21/02*    (2006.01)
(52) U.S. Cl. ...................... 359/661; 359/656; 359/784; 359/754
(58) Field of Classification Search ........ 359/656–661, 359/784, 754
See application file for complete search history.

(56) References Cited

U.S. PATENT DOCUMENTS

| | | | | | |
|---|---|---|---|---|---|
| 3,297,393 | A | * | 1/1967 | Ziegler | 359/660 |
| 3,598,474 | A | * | 8/1971 | Shoemaker | 359/659 |
| 3,661,446 | A | * | 5/1972 | Mori et al. | 359/657 |
| 3,700,311 | A | * | 10/1972 | Shoemaker | 359/656 |
| 3,746,428 | A | * | 7/1973 | Shoemaker | 359/657 |
| 3,902,793 | A | * | 9/1975 | Shoemaker | 359/659 |
| 4,373,785 | A | * | 2/1983 | Shoemaker | 359/656 |
| 5,444,573 | A | * | 8/1995 | Saito | 359/659 |
| 5,502,596 | A | * | 3/1996 | Suzuki | 359/657 |
| 5,517,360 | A | * | 5/1996 | Suzuki | 359/658 |
| 5,532,878 | A | * | 7/1996 | Suenaga et al. | 359/657 |
| 5,798,869 | A | * | 8/1998 | Watanabe | 359/658 |
| 5,805,346 | A | * | 9/1998 | Tomimatsu | 359/656 |
| 5,889,617 | A | * | 3/1999 | Yamada et al. | 359/657 |
| 5,978,147 | A | * | 11/1999 | Kudo | 359/656 |
| 5,982,559 | A | * | 11/1999 | Furutake | 359/656 |
| 6,501,603 | B1 | * | 12/2002 | Kasahara | 359/656 |
| 6,519,092 | B1 | * | 2/2003 | Yamaguchi | 359/656 |
| 6,700,710 | B1 | * | 3/2004 | Watanabe | 359/661 |
| 6,747,804 | B1 | * | 6/2004 | Fujimoto et al. | 359/656 |
| 2002/0089760 | A1 | * | 7/2002 | Yamaguchi | 359/656 |
| 2003/0043473 | A1 | * | 3/2003 | Okuyama | 359/659 |
| 2003/0053218 | A1 | * | 3/2003 | Fujimoto et al. | 359/656 |

FOREIGN PATENT DOCUMENTS

| | | | |
|---|---|---|---|
| JP | 2000-35541 | * | 2/2000 |
| JP | 2002-98903 | * | 4/2002 |

(Continued)

*Primary Examiner*—Evelyn A. Lester
(74) *Attorney, Agent, or Firm*—Miles & Stockbridge P.C.

(57) ABSTRACT

To provide an immersion microscope objective lens capable of making a numerical aperture NA larger than 1.45 even if an ordinary oil is used, the objective lens includes, in order from an object, a first lens group, a second lens group, and a third lens group. The first lens group includes a first cemented lens constructed by a plano-convex lens having a plane surface facing to the object cemented with a meniscus lens having a convex surface facing to an image, and two or more cemented positive lenses disposed to the image side of the first cemented lens. The second lens group includes one or more cemented lens. The third lens group includes, in order from the object, a cemented meniscus lens having a strong concave surface facing to the image, and a cemented meniscus lens having a strong concave surface facing to the object. Given conditional expressions are satisfied.

4 Claims, 9 Drawing Sheets

FOREIGN PATENT DOCUMENTS

| | | | |
|---|---|---|---|
| JP | 2002-341249 | * | 11/2002 |
| JP | 2002-350734 | | 12/2002 |
| JP | 2003-015046 | | 1/2003 |
| JP | 2004-61589 | * | 2/2004 |

* cited by examiner

IMMERSION MICROSCOPE OBJECTIVE LENS

The disclosures of the following priority application is herein incorporated by reference:

Japanese Patent Application No. 2004-303219 filed on Oct. 18, 2004.

BACKGROUND OF THE INVENTION

1. Field of the Invention

The present invention relates to an immersion microscope objective lens suitable for observing an object (specimen) filled with a liquid, and particularly to an immersion microscope objective lens suitable for a total internal reflection fluorescence microscope (TIRFM).

2. Related Background Art

An immersion observation of an object (specimen) is a method to observe the object with a high magnification by filling an optical path between an objective lens and the object to be observed with a liquid such as water or oil to make a numerical aperture NA of the immersion microscope objective lens larger than one (>1) in accordance with refractive index of the liquid.

A total internal reflection fluorescence microscope using an immersion microscope objective lens has been known (see Japanese Patent Application Laid-Open No. 2003-15046). This has shown an observation method of an object to be observed by illuminating the object with evanescent light oozing out to the object side through a cover glass, an immersion liquid, and an immersion microscope objective lens and collecting fluorescence from the object. The evanescent light is weak light produced when illumination light is reflected with total internal reflection from a boundary surface between an object and a cover glass. In order to produce the evanescent light, it is necessary that the illumination light is incident to the boundary surface between an object and a cover glass with a large angle (more than the critical angle), so that an immersion microscope objective lens with a large numerical aperture NA is indispensable. According to the total internal reflection fluorescence microscope, information of the object only near the boundary surface can be effectively obtained.

To make the numerical aperture NA of an immersion microscope objective lens large, it is generally desired that refractive index of the immersion liquid is increased. Incidentally, as to refractive index at d-line ($\lambda$=587 nm), water is 1.333, glycerin is 1.473, and oil is 1.515. Accordingly, when oil with highest refractive index among them is used for an immersion liquid, the numerical aperture NA of an immersion microscope objective lens can be made large. In order to make the numerical aperture NA further large, a special oil having higher refractive index than the oil (refractive index is 1.515) has been developed. For example, Japanese Patent Application Laid-Open No. 2003-15046 discloses di-phenyl ether with refractive index of about 1.579.

However, a special oil with high refractive index usually has a lot of additives. Accordingly, when an object is observed with a fluorescence observation using a special oil as an immersion liquid, noise component caused by autofluorescence of the additives in the special oil becomes large. Although an oil with the least noise component is the above-described ordinary oil with refractive index of 1.515 (at d-line, 23° C.), the oil does not provide a sufficient numerical aperture NA. As long as using an ordinary oil, the largest numerical aperture NA of an immersion microscope objective lens has been 1.45 so far.

SUMMARY OF THE INVENTION

The present invention is made in view of the aforementioned problems and has an object to provide an immersion microscope objective lens capable of making a numerical aperture NA larger than 1.45 even if using an ordinary oil.

According to an aspect of the present invention, an immersion microscope objective lens includes, in order from an object, a first lens group, a second lens group, and a third lens group. The first lens group includes a first cemented lens constructed by a plano-convex lens having a plane surface facing to the object cemented with a meniscus lens having a convex surface facing to an image, and two or more cemented positive lenses disposed to the image side of the first cemented lens. The second lens group includes one or more cemented lens. The third lens group includes, in order from the object side, a cemented meniscus lens having a strong concave surface facing to the image, and a cemented meniscus lens having a strong concave surface facing to the object. The following conditional expressions (1), (2) and (3) are satisfied:

$$\{|r_1|^2 - (|r_1| - d_1)^2\}^{1/2} - [5.13 \times (d_A - d_B) + 0.775] > 0 \quad (1)$$

$$|r_1| + 16.67 \times (n_1 - n_2)/n_1/n_2 < 0 \quad (2)$$

$$0.10 < |f/f_3| < 0.16 \quad (3)$$

where $r_1$ denotes a radius of curvature of a cemented surface between the plano-convex lens and the meniscus lens in the first lens group, $d_1$ denotes a thickness along the optical axis of the plano-convex lens, $d_A$ denotes a distance between the plane surface of the plano-convex lens and the object plane, $d_B$ denotes a thickness of a cover glass arranged between the plane surface and the object plane, $n_1$ denotes refractive index of the plano-convex lens, $n_2$ denotes refractive index of the meniscus lens, f denotes the focal length of the immersion microscope objective lens, and $f_3$ denotes the focal length of the third lens group.

In one preferred embodiment of the present invention, the following conditional expression (4) is preferably satisfied:

$$NA \geq 0.965 \times n_0 \quad (4)$$

where NA denotes a numerical aperture of the immersion microscope objective lens, and $n_0$ denotes refractive index of the immersion liquid.

In one preferred embodiment of the present invention, it is preferable that the second lens group and the third lens group are a correction lens group capable of moving in a body along the optical axis and the following conditional expression (5) is preferably satisfied:

$$|f/fb| \leq 0.2 \quad (5)$$

where fb denotes a focal length of the correction lens and f denotes the focal length of the immersion microscope objective lens.

Other features and advantages according to the invention will be readily understood from the detailed description of the preferred embodiment in conjunction with the accompanying drawings.

DESCRIPTION OF THE MOST PREFERRED EMBODIMENTS

Each embodiment according to the present invention is explained below with reference to accompanying drawings.

EXAMPLE 1

Figure 1:
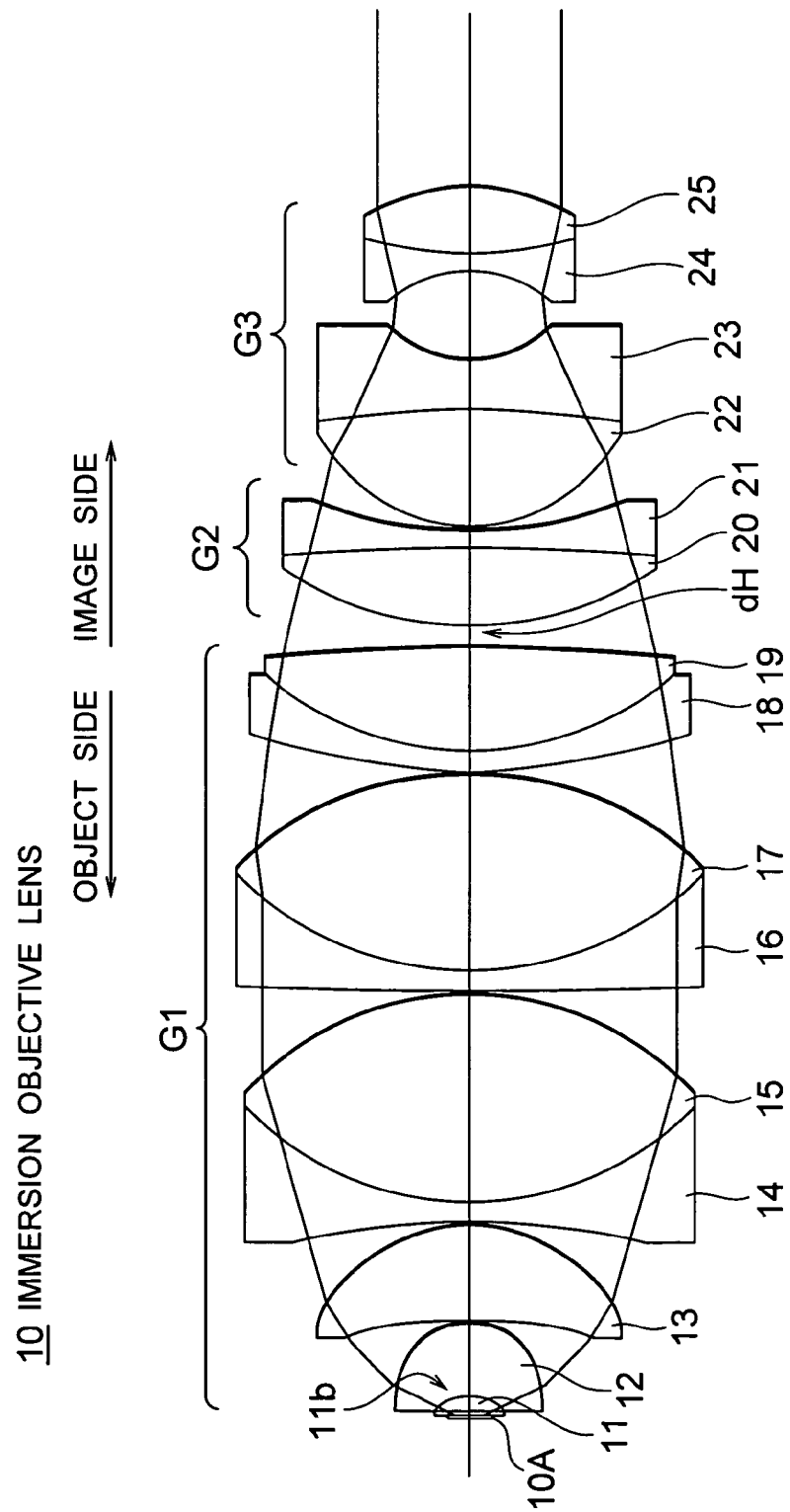
FIG. 1 is a graph showing an immersion microscope objective lens 10 according to Example 1 of the present invention.

FIG. 1 is a graph showing an immersion microscope objective lens 10 according to Example 1 of the present invention. The immersion microscope objective lens 10 is composed of a three-lens-group construction which is, in order from an object (left side in FIG. 1), a first lens group G1 having positive refractive power, a second lens group G2 having negative refractive power, and a third lens group G3 having negative refractive power.

The first lens group G1 includes a cemented lens (11, 12) disposed to the most object side constructed by a plano-convex lens 11 cemented with a positive meniscus lens 12. The plano-convex lens 11 has a plane surface facing to the object and a convex surface facing to the image. The positive meniscus lens 12 has a concave surface facing to the object and a convex surface facing to the image. The cemented lens (11, 12) has positive refractive power.

To the image side of the cemented lens (11, 12), there are a positive meniscus lens 13 having a convex surface facing to the image, and three cemented lens groups (14, 15), (16, 17), and (18, 19) each having positive refractive power. The cemented lens (14, 15) is constructed by a negative lens 14 cemented with a positive lens 15 and has a convex surface facing to the image. The cemented lens (16, 17) is constructed by a negative meniscus lens 16 cemented with a positive lens 17. The cemented lens (18, 19) is constructed by a negative meniscus lens 18 having a convex surface facing to the object cemented with a positive lens 19.

The second lens group G2 includes a cemented lens (20, 21) having negative refractive power. The cemented lens (20, 21) is constructed by a positive lens 20 cemented with a negative lens 21 and has a convex surface facing to the object.

The third lens group G3 includes two cemented lenses (22, 23) and (24, 25) each having negative refractive power. The object side cemented lens (22, 23) is constructed by a positive lens 22 cemented with a negative lens 23 and has a strong concave surface facing to the image. The image side cemented lens (24, 25) is constructed by a negative lens 24 cemented with a positive lens 25 and has a strong concave surface facing to the object. The third lens group G3 is a Gauss type lens group.

Figure 2:
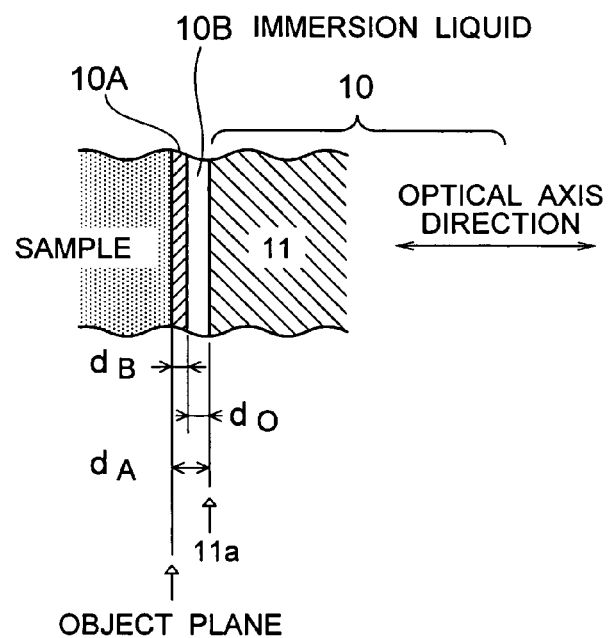
FIG. 2 is an enlarged graph showing a tip of the immersion microscope objective lens 10 according to Example 1 of the present invention.

When an object (a sample such as a living cell) is observed by a total internal reflection fluorescence microscope (TIRFM) using the immersion microscope objective lens 10 according to Example 1 of the present invention, a cover glass 10A is disposed to the immersion microscope objective lens 10 side of the object as shown in FIG. 2. FIG. 2 is an enlarged graph showing a tip of the immersion microscope objective lens 10.

A space between the cover glass 10A and the tip (the object side plane surface 11a of the plano-convex lens 11) of the immersion microscope objective lens 10 is filled with an immersion liquid 10B. The immersion liquid 10B is an ordinary oil. Refractive index at d-line (587 nm) of the ordinary oil is nd=1.515 (23° C.) and the oil produces the least autofluorescence.

Here, a distance between the plane 11a of the plano-convex lens and the object plane (a boundary between the object and the cover glass 10A) is assumed to be $d_A$, and the thickness of the cover glass is $d_B$, a working distance $d_0$ of the immersion microscope objective lens 10 is expressed by:

$$d_0 = d_A - d_B.$$

In Example 1, the cover glass 10A is assumed to have refractive index of nd=1.5221, Abbe number of vd=58.8 at d-line (587 nm), and the thickness of $d_B$=0.17 (mm).

In the immersion microscope objective lens 10 according to Example 1 of the present invention, in order to prevent spherical aberration from being produced at the boundary (plane 11a) between the plano-convex lens 11 being the front lens and the immersion liquid 10B, refractive index (nd=1.518) of the plano-convex lens 11 is made to be nearly equal to that of the immersion liquid 10B (nd=1.515).

Moreover, in the immersion microscope objective lens 10 according to Example 1 of the present invention, in order to make the numerical aperture NA larger than 1.45, the radius of the curvature $r_1$ of the cemented surface 11b (see FIG. 1) between the plano-convex lens 11 and the meniscus lens 12 is made large to become the shape of the cemented surface 11b gentle. By the way, the numerical aperture NA is determined by $n \times \sin\theta$. In ordinary oil (n=1.515), since refractive index is not large, the angle $\theta$ is necessary to be large. When the angle $\theta$ is made large, in order not to be shielded the peripheral rays, the cemented surface 11b is made to be a gentle shape. More specifically, the following conditional expression (1) should be satisfied:

$$\{|r_1|^2(|r_1|-d_1)^2\}^{1/2} - [5.13 \times (d_A - d_B) + 0.775] > 0 \quad (1)$$

where $(d_A-d_B)=d_0$ denotes the working distance, $d_1$ denotes the thickness along the optical axis of the plano-convex lens 11, and $r_1$ denotes radius of curvature of the cemented surface 11b.

When conditional expression (1) is not satisfied, effective diameter of bundle of ray for large numerical aperture NA cannot be secured at the plane 11a of the plano-convex lens 11. When conditional expression (1) is satisfied, effective diameter of bundle of ray for large numerical aperture NA can be secured by making the shape of the cemented surface 11b gentle. Conditional expression (1) is for defining the lower limit of the radius of curvature $r_1$ of the cemented surface 11b. The left side of conditional expression (1) is preferably larger than 0.2.

In the immersion microscope objective lens 10 according to Example 1 of the present invention, however, Petzval sum is necessary to be largely reduced by strong negative refractive power of the cemented surface 11b. Accordingly, when the shape of the cemented surface 11b becomes too gentle (in other words, the radius of curvature of the cemented surface becomes too large) within a range satisfying conditional expression (1), it becomes impossible to sufficiently reduce Petzval sum.

A shortfall of reduction in Petzval sum at the cemented surface 11b can be corrected to a certain extent. However, this has a limit.

In the immersion microscope objective lens 10 according to Example 1 of the present invention, in order to define the upper limit of the radius of curvature $r_1$ of the cemented surface 11b, the following conditional expression (2) should be satisfied:

$$|r_1|+16.67\times(n_1-n_2)/n_1/n_2>0 \qquad (2)$$

where $n_1$ denotes refractive index of the plano-convex lens 11, $n_2$ denotes refractive index of the meniscus lens 12, and $r_1$ denotes the radius of curvature of the cemented surface 11b.

When conditional expression (2) is not satisfied, the radius of curvature $r_1$ of the cemented surface 11b becomes too large to sufficiently reduce Petzval sum and the shortfall cannot be corrected by the negative refractive power of the third lens group G3. When conditional expression (2) is satisfied, Petzval sum can be reduced as a whole by making the shape of the cemented surface 11b gentle. Incidentally, the left side of conditional expression (2) is preferably less than −0.2.

In the immersion microscope objective lens 10 according to Example 1 of the present invention, the following conditional expression (3) is satisfied:

$$0.10<|f/f_3|<0.16 \qquad (3)$$

where f denotes the focal length of the objective lens, and $f_3$ denotes the focal length of the third lens group. Conditional expression (3) defines an appropriate range of negative refractive power of the third lens group G3.

When conditional expression (3) is not satisfied because negative refractive power of the third lens group G3 is too small, a shortfall of reduction in Petzval sum at the cemented surface 11b cannot be corrected, so that Petzval sum becomes large as a whole. On the other hand, when conditional expression (3) is not satisfied because negative refractive power of the third lens group G3 is too large, chromatic change in coma and sagittal coma become worse. When conditional expression (3) is satisfied, coma can be kept in a satisfactory level with reducing Petzval sum as a whole.

In the immersion microscope objective lens 10 according to Example 1 of the present invention, by satisfying conditional expressions (1), (2) and (3) in this manner, the effective diameter of a bundle of ray of a large numerical aperture NA can be secured and Petzval sum can be reduced as a whole with making the shape of the cemented surface 11b gentle. Accordingly, even if an ordinary oil (nd=1.515, 23° C.) with the least autofluorescence is used as an immersion liquid 10B, the numerical aperture NA can be made larger than 1.45.

The numerical aperture NA of the immersion microscope objective lens 10 satisfies the following conditional expression (4):

$$NA\geq 0.965\times n_0 \qquad (4)$$

where NA denotes a numerical aperture of the immersion microscope objective lens, and $n_0$ denotes refractive index of the immersion liquid 10B. When refractive index of the above-described ordinary oil (nd=1.515) is substituted for refractive index $n_0$ of conditional expression (4), the right side becomes 1.46. In this case, conditional expression (4) becomes NA≧=1.46.

In an immersion microscope objective lens 10 satisfying conditional expression (4), even if an ordinary oil (nd=1.515) is used for an immersion liquid 10B, the numerical aperture NA can be made larger than 1.45. On-axis bundle of ray of a large numerical aperture NA satisfying conditional expression (4) can be transmitted without being shielded. In observation of an object with a total internal reflection fluorescence microscope (TIRFM), an on-axis bundle of ray with a large numerical aperture NA satisfying conditional expression (4) is used as an illumination light for the object.

In the immersion microscope objective lens 10 according to Example 1 of the present invention, the second lens group G2 and the third lens group G3 can be used as a correction lens group (correction ring) capable of being moved along the optical axis in a body.

In this case, the correction ring (G2, G3) is preferably moved within a rang satisfying the following conditional expression (5):

$$|f/fb|\leq 0.2 \qquad (5)$$

where fb denotes a combined focal length of the second lens group G2 and the third lens group G3 (in other words, the focal length fb of the correction ring (G2, G3)), and f denotes the focal length of the immersion microscope objective lens. Conditional expression (5) defines an appropriate range of refractive power of the correction ring (G2, G3).

When conditional expression (5) is not satisfied, variation in focusing position becomes large upon moving the correction ring (G2, G3). On the other hand, when conditional expression (5) is satisfied, the correction ring (G2, G3) can be moved with suppressing variation in focusing position. Upon moving the correction ring (G2, G3), the first lens group G1 is fixed. Accordingly, variation in aberrations of the immersion microscope objective lens 10 can be corrected by varying a distance $d_H$ between the first lens group G1 and the second lens group G2 in response to moving amount of the correction ring (G2, G3).

Here, environmental temperature of the immersion microscope objective lens 10 varies with the observation method and, for example, in an ordinary microscope observation, the temperature is about 23° C. A total internal reflection fluorescence microscope (TIRFM) is often used for an observation on a living cell. In this case, the temperature is about 37° C. The temperature of the immersion liquid 10B (ordinary oil) also varies in accordance with the change in environmental temperature resulting in a change in refractive index $n_0$. For example, refractive index $n_0$ of the immersion liquid 10B at 30° C. is nd=1.51299 at d-line (587 nm), nC=1.50931 at C-line (656 nm), nF=1.52192 at F-line (486 nm), and ng=1.52930 at g-line (436 nm). Relative to the refractive index $n_0$ at 30° C., refractive index varies $\pm 2.8 \times 10^{-3}$ at 23° C. and 37° C., respectively.

When refractive index $n_0$ of the immersion liquid 10B varies in this manner, an optical path length between the tip (the plane 11a of the plano-convex lens 11) of the immersion microscope objective lens 10 and the object varies, so that various aberrations of the immersion microscope objective lens 10 vary to cause degradation in optical performance.

Therefore, by changing the distance $d_H$ between the first lens group G1 and the second lens group G2 in response to the movement of the correction ring (G2, G3), variation in aberrations (degradation in optical performance) caused by variation in refractive index $n_0$ of the immersion liquid 10B or fabrication error of the thickness $d_B$ of the cover glass 10A can be corrected. When the above-described conditional expression (5) is satisfied, variation in various aberrations can be corrected with keeping variation in focusing position small.

Specific configuration of the lens data according Example 1 of the present invention is shown in Table 1.

TABLE 1

[Specifications]

| f = 3.33 | NA = 1.5 | β = −60 | $d_0$ = 0.13 |
|---|---|---|---|

[Lens Data]

| surface number | r | d | nd | vd |
|---|---|---|---|---|
| 1 | ∞ | 0.75 | 1.51823 | 58.9 |
| 2 | −2.243 | 3.85 | 2.00330 | 28.3 |
| 3 | −3.827 | 0.10 | | |
| 4 | −23.274 | 5.00 | 1.59240 | 68.3 |
| 5 | −8.761 | 0.15 | | |
| 6 | −38.045 | 1.00 | 1.62004 | 36.3 |
| 7 | 16.326 | 11.00 | 1.56907 | 71.3 |
| 8 | −15.900 | 0.15 | | |
| 9 | 331.735 | 1.00 | 1.72047 | 34.7 |
| 10 | 17.000 | 10.40 | 1.43385 | 95.2 |
| 11 | −17.778 | 0.15 | | |
| 12 | 34.108 | 1.00 | 1.65412 | 39.7 |
| 13 | 16.200 | 5.60 | 1.43385 | 95.2 |
| 14 | −103.612 | $d_H$ | | |
| 15 | 17.000 | 4.10 | 1.43385 | 95.2 |
| 16 | −129.879 | 1.00 | 1.65412 | 39.7 |
| 17 | 21.365 | 0.15 | | |
| 18 | 9.002 | 6.10 | 1.60300 | 65.4 |
| 19 | −48.082 | 2.65 | 1.80400 | 46.6 |
| 20 | 5.900 | 4.45 | | |
| 21 | −6.584 | 1.00 | 1.77250 | 49.6 |
| 22 | 20.800 | 3.40 | 1.84666 | 23.8 |
| 23 | −11.342 | | | |

| Immersion Temp. | Variable Distance $d_H$ |
|---|---|
| 23° C. | 0.89 |
| 30° C. | 1.00 |
| 37° C. | 1.13 |

In [Specifications] of Table 1 showing various values for the immersion microscope objective lens 10, f denotes the focal length, NA denotes a numerical aperture, β denotes a magnification, $d_0$ denotes a working distance. In [Lens Date], surface number is a number according to a lens surface counted in order from an object, the 1-st through the 14-th surfaces belong to the first lens group G1, the 15-th through 17-th surfaces belong to the second lens group G2, and the 18-th through 23-rd surfaces belong to the third lens group G3.

The negative sign (−) in the radius of curvature r means that the surface is a convex surface facing to the image. A surface distance d is a thickness of a lens or an air space along the optical axis. "nd" and "vd" are refractive index and Abbe number of a glass material used for a lens at d-line, respectively.

Though the unit of length such as the focal length, the radius of curvature, the distance between surfaces and the other data described in various values of all the specifications below is generally expressed in "mm", the unit of the data is not limited to "mm" since the optical system can provide the same optical performance even if it is proportionally enlarged or reduced.

Values for respective conditional expressions (1), (2), (3) and (5) are shown below.

(1): the left side=0.23
(2): the left side=−0.42
(3): |f/f3|=0.11
(5): |f/fb|=0.13

Figure 3:
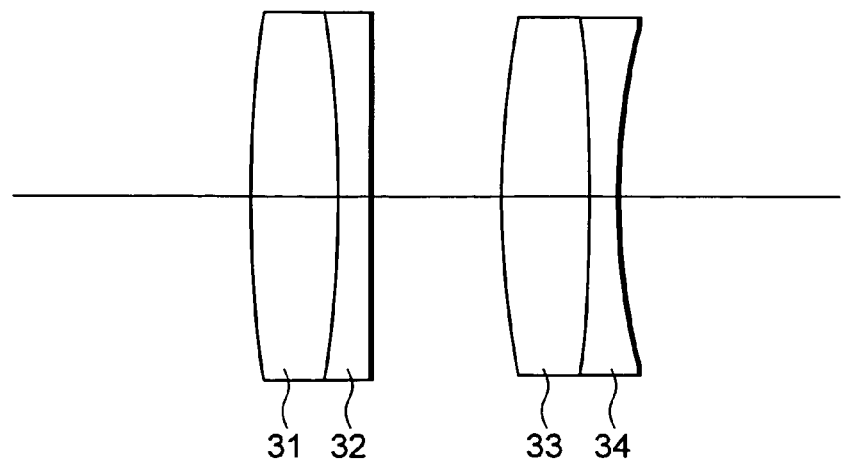
FIG. 3 is a graph showing an imaging lens 30 works as a second objective lens.

The immersion microscope objective lens 10 according to Example 1 is an objective lens for an infinity optical system. Accordingly, when the immersion microscope objective lens 10 is used, it is necessary to arrange an imaging lens to the rear side of the objective lens. The imaging lens works as a second objective lens. An example of such imaging lens is as shown in FIG. 3. The imaging lens 30 shown in FIG. 3 is a two-lens-group construction composed of, in order from an object, a cemented lens constructed by a positive lens 31 cemented with a negative lens 32 and a cemented lens constructed by a positive lens 33 cemented with a negative lens 34. A specific construction of the imaging lens 30 is shown in Table 2.

TABLE 2

| surface number | r | d | nd | vd |
|---|---|---|---|---|
| 1 | 75.043 | 5.10 | 1.62280 | 57.0 |
| 2 | −75.043 | 2.00 | 1.74950 | 35.2 |
| 3 | 1600.58 | 7.50 | | |
| 4 | 50.256 | 5.10 | 1.66755 | 42.0 |
| 5 | −84.541 | 1.80 | 1.61266 | 44.4 |
| 6 | 36.911 | | | |

Figure 4:
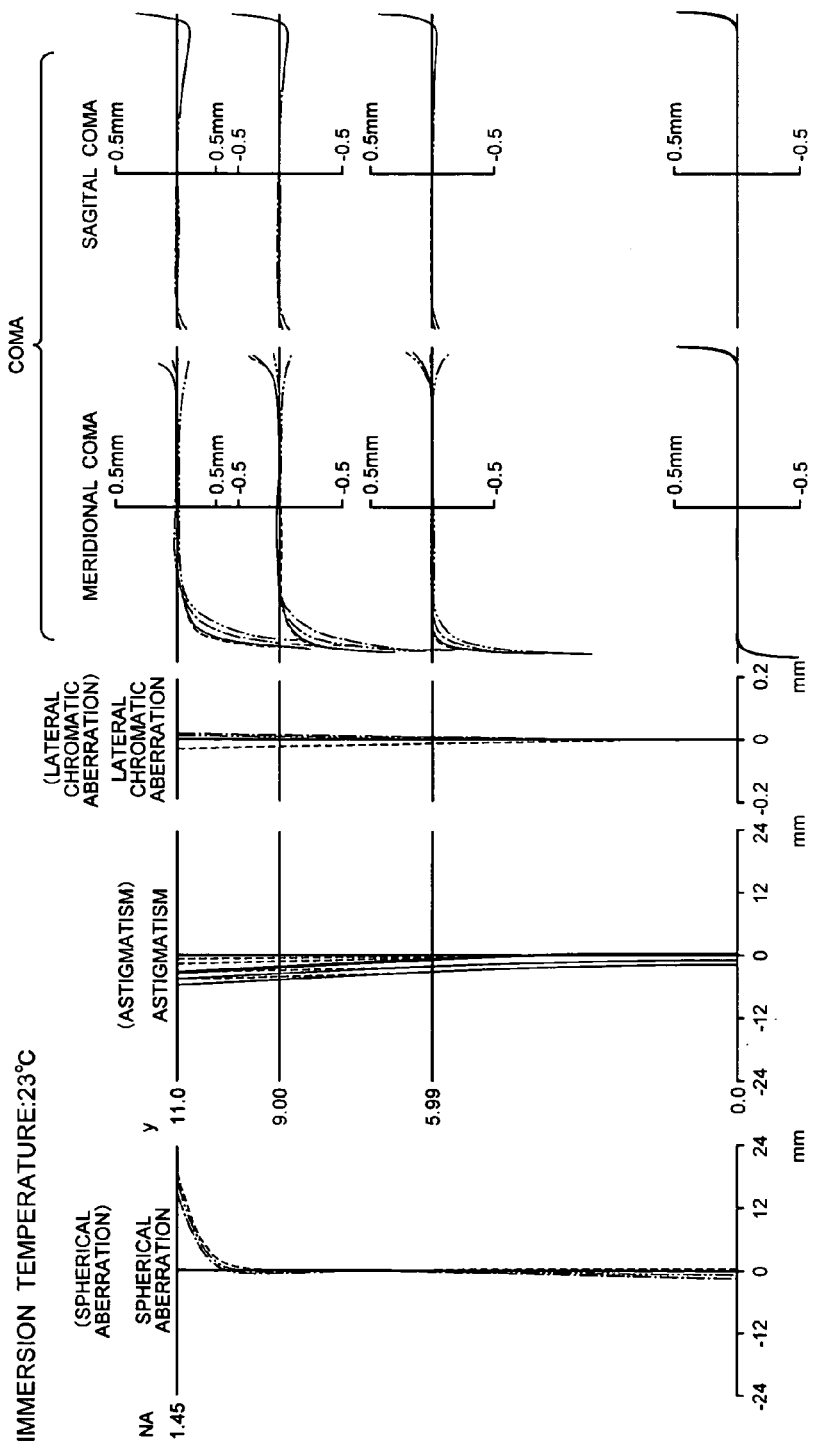
FIG. 4 is graphs showing various aberrations of the immersion microscope objective lens 10 according to Example 1 of the present invention (immersion liquid: 23° C.).
Figure 5:
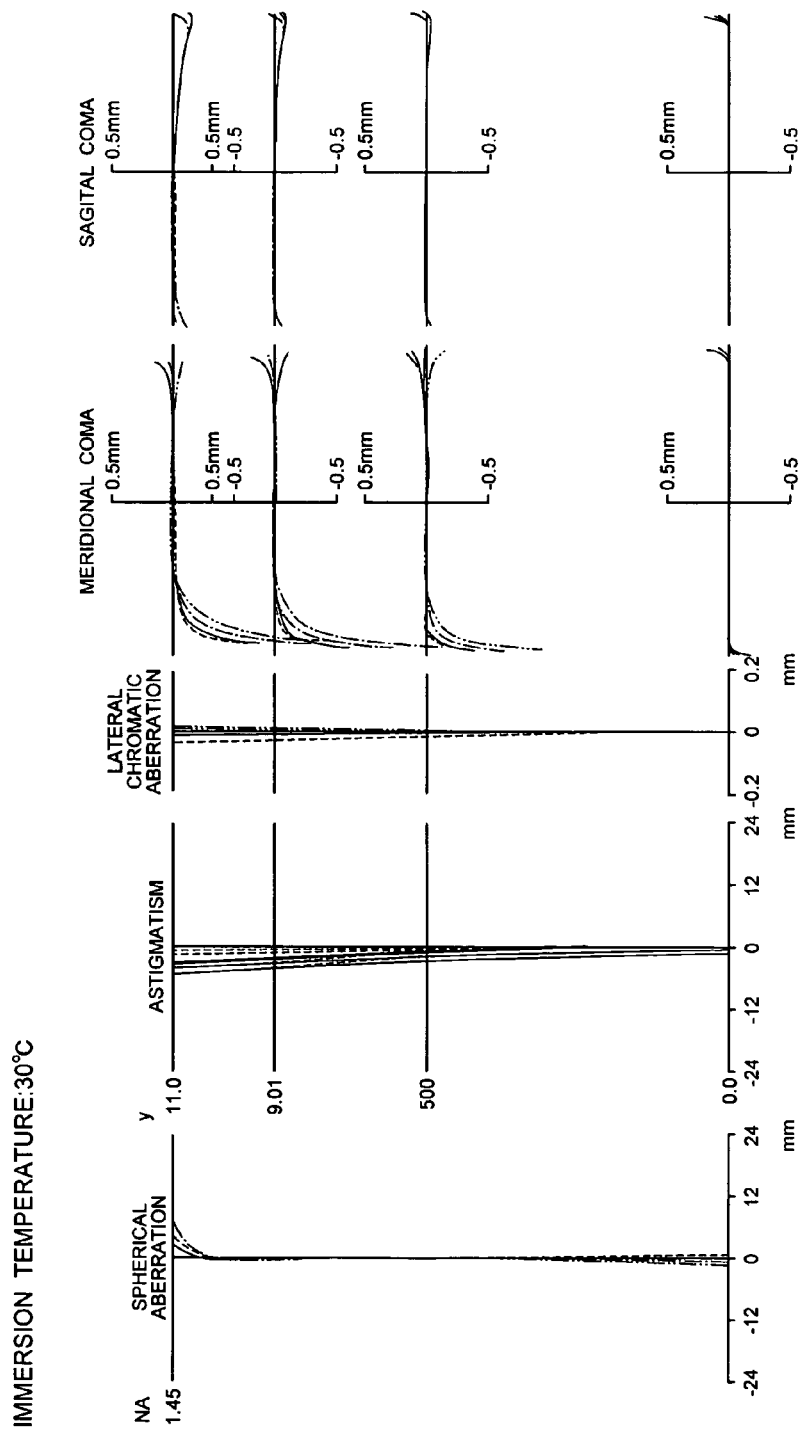
FIG. 5 is graphs showing various aberrations of the immersion microscope objective lens 10 according to Example 1 of the present invention (immersion liquid: 30° C.).
Figure 6:
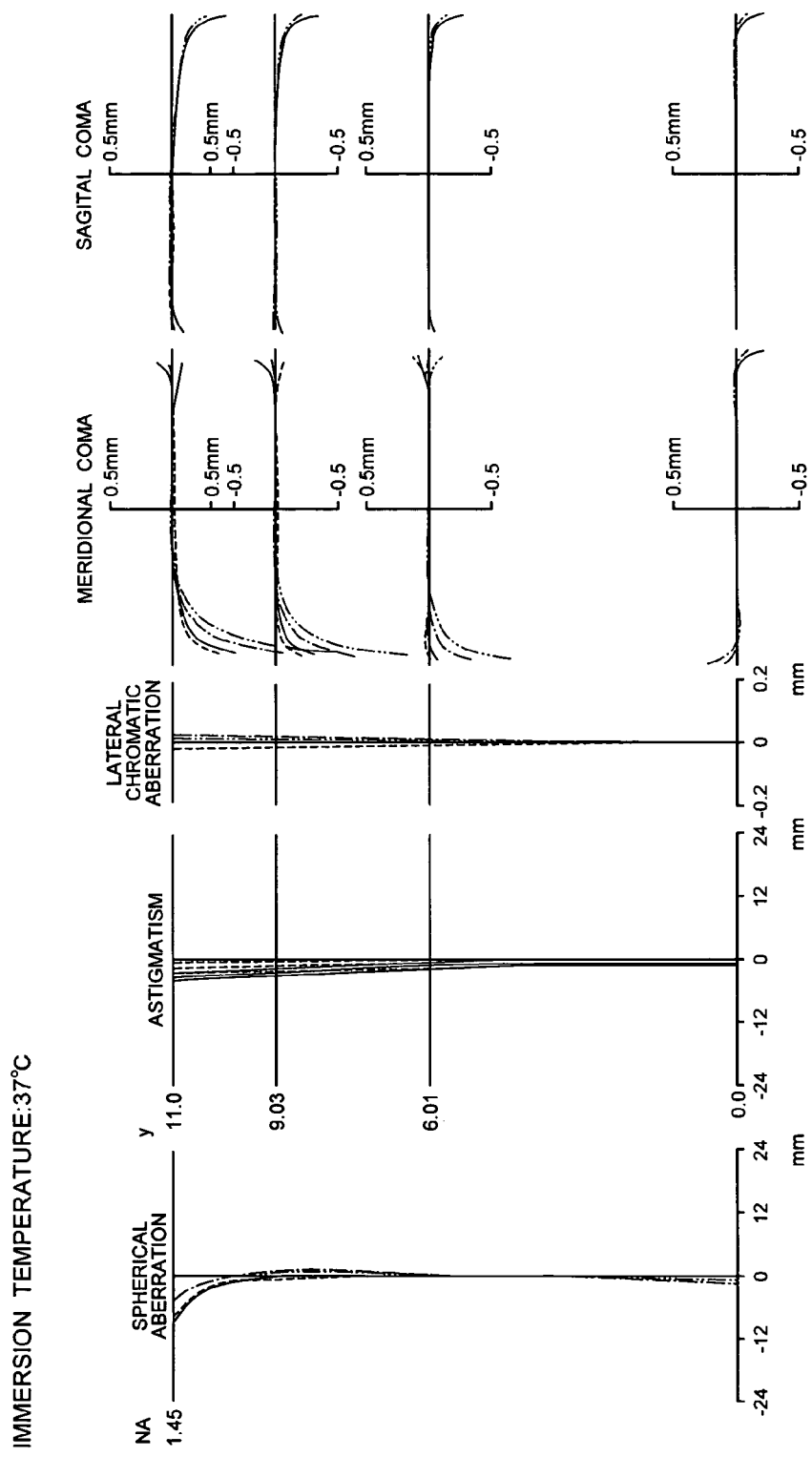
FIG. 6 is graphs showing various aberrations of the immersion microscope objective lens 10 according to Example 1 of the present invention (immersion liquid: 37° C.).

FIGS. 4 to 6 are graphs showing various aberrations (spherical aberration, astigmatism, lateral chromatic aberration, and coma) of the immersion microscope objective lens 10 according to Example 1 of the present invention on the basis of the lens data shown in Table 1. Various aberrations shown in FIGS. 4 to 6 are the case combined with the imaging lens 30 shown in FIG. 3. The distance between the immersion microscope objective lens 10 and the imaging lens 30 is assumed to be about 150 mm. Even if the distance varies somewhat, variation in aberrations is considered to be negligible.

Respective graphs in FIGS. 4 to 6 show various aberrations at the temperature of the immersion liquid 10B of 23° C., 30° C., and 37° C., respectively. In respective graphs showing spherical aberration, lateral chromatic aberration and coma shown in FIGS. 4 to 6, a solid line denotes aberration at d-line (587 nm), a broken line denotes that at C-line (656.3 nm), a dashed line denotes that at F-line (486.1 nm), and a chain double-dashed line denotes that at g-line (435.8 nm). In the graph showing astigmatism, a solid line indicates a sagittal image plane and a broken line indicates a meridional image plane, respectively. Optical performance is evaluated by the observation light from the object with the numerical aperture NA=1.45.

As is apparent from the graphs shown in FIGS. 4 to 6 and the lens data listed in Table 1, the immersion microscope objective lens 10 according to Example 1 corrects well various aberrations over the temperature range (23° C. to 37° C.) of the immersion liquid 10B. Accordingly, an object (sample) can be observed in a preferable aberration state by using the immersion microscope objective lens 10 with a total internal reflection fluorescence microscope (TIRFM) (about 37° C.) as well as with an ordinary microscope (about 23° C.). Moreover, even if a fabrication error is exist in the cover glass 10A with the thickness of dB, the object (sample) can be observed in a preferable aberration state.

Furthermore, in the immersion microscope objective lens 10 according to Example 1 of the present invention, since the numerical aperture NA can be made larger than 1.45 with using an ordinary oil as an immersion liquid 10B, refractive index of the object is not limited to nd=1.33 to 1.38, even if refractive index is nd=1.45, an observation with a total internal reflection fluorescence microscope (TIRFM) is possible. Moreover, there is an advantage that by making a numerical aperture NA larger than 1.45, an area of incident ray of a total internal reflection illumination can be expanded. When the immersion microscope objective lens 10 is used for an ordinary microscope observation, it becomes possible to carry out an observation with high resolution by means of a high numerical aperture. Since an ordinary oil is used as an immersion liquid 10B, a clear object (sample) image with little noise component caused by autofluorescence of the immersion liquid 10B can be observed.

EXAMPLE 2

Figure 7:
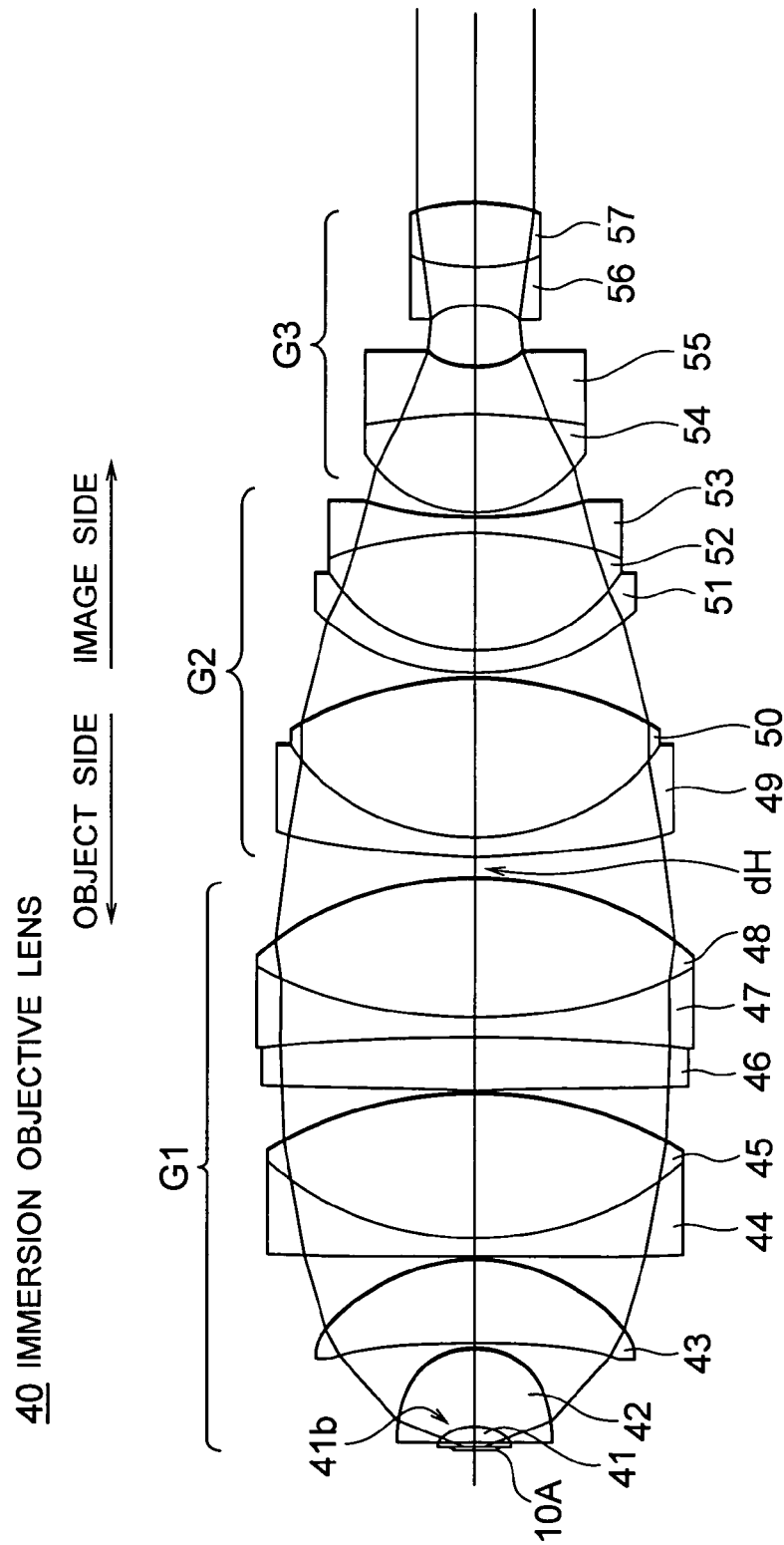
FIG. 7 is a graph showing an immersion microscope objective lens 40 according to Example 2 of the present invention.

As shown in FIG. 7, an immersion microscope objective lens 40 according to Example 2 of the present invention is a three-lens-group construction similar to the immersion microscope objective lens 10 shown in FIG. 1.

A first lens group G1 is composed of a cemented lens (41, 42) constructed by a plano-convex lens 41 cemented with a meniscus lens 42, a positive meniscus lens 43, and two cemented positive lenses (44, 45) and (46, 47, 48). The cemented lens (44, 45) is constructed by a negative meniscus lens 44 cemented with a positive lens 45. The cemented lens (46, 47, 48) is constructed by a positive lens 46 cemented with a negative lens 47 cemented with a positive lens 48.

A second lens group G2 is composed of two cemented lenses (49, 50) and (51, 52, 53). The cemented lens (49, 50) with positive refractive power is constructed by a negative meniscus lens 49 having a convex surface facing to the object cemented with a positive lens 50. The cemented lens (51, 52, 53) having a convex surface facing to the object and having negative refractive power as a whole is constructed by a negative meniscus lens 51 having a convex surface facing to the object cemented with a positive lens 52 cemented with a negative lens 53.

A third lens group G3 is composed of two cemented negative lenses (54, 55) and (56, 57). The cemented lens (54, 55) having a strong concave surface facing to the image is constructed by a positive lens 54 cemented with a negative lens 55. The cemented lens (56, 57) having a strong concave surface facing to the object is constructed by a negative lens 56 cemented with a positive lens 57. The third lens group G3 is a Gauss type lens group.

In the immersion microscope objective lens 40 according to Example 2 of the present invention, by satisfying conditional expressions (1) to (3), an effective diameter of a bundle of ray for a large numerical aperture NA can be secured and Petzval sum can be reduced as a whole with making a cemented surface 41b between the plano-convex lens 41 and the meniscus lens 42 a gentle shape. Accordingly, even if an ordinary oil (refractive index nd=1.515, 23° C.) with little autofluorescence is used as an immersion liquid 10B, a numerical aperture NA can be made larger than 1.45.

The immersion microscope objective lens 40 according to Example 2 of the present invention satisfies the above-described conditional expression (4) relative to refractive index $n_0$ of the immersion liquid 10B. Accordingly, even if an ordinary oil (refractive index nd=1.515) is used as an immersion liquid 10B, an on-axis bundle of ray for a large numerical aperture NA satisfying conditional expression (4) can be transmitted without being shielded. Upon observation of an object (specimen) with a total internal reflection fluorescence microscope (TIRFM), an on-axis bundle of ray for a large numerical aperture NA satisfying conditional expression (4) is used for an illumination light.

In response to the movement of the correction ring (G2, G3) of the immersion microscope objective lens 40, the distance dH between the first lens group G1 and the second lens group G2 is varied, so that variation in aberrations (degradation in optical performance) caused by variation in refractive index $n_0$ of the immersion liquid 10B or fabrication error of the thickness dB of the cover glass 10A can be corrected.

Specific configuration of the lens data according Example 2 of the present invention is shown in Table 3. Table 3 is similar to Table 1, so a supplementary explanation is omitted.

TABLE 3

| [Specifications] | | | |
|---|---|---|---|
| f = 2.0 | NA = 1.5 | β = −100 | $d_0$ = 0.13 |

| [Lens Data] | | | |
|---|---|---|---|
| surface number | r | d | nd | vd |
|---|---|---|---|---|
| 1 | ∞ | 0.93 | 1.51742 | 52.3 |
| 2 | −2.322 | 3.95 | 2.00330 | 28.3 |
| 3 | −3.939 | 0.15 | | |
| 4 | −38.362 | 4.30 | 1.59240 | 68.3 |
| 5 | −9.799 | 0.10 | | |
| 6 | 255.173 | 1.00 | 1.65412 | 39.7 |
| 7 | 16.559 | 7.50 | 1.56907 | 71.3 |
| 8 | −20.805 | 0.15 | | |
| 9 | 232.841 | 2.70 | 1.56907 | 71.3 |
| 10 | −123.237 | 1.00 | 1.75692 | 31.6 |
| 11 | 24.361 | 7.30 | 1.43385 | 95.2 |
| 12 | −17.837 | $d_H$ | | |
| 13 | 40.318 | 1.00 | 1.72047 | 34.7 |
| 14 | 11.663 | 8.30 | 1.43385 | 95.2 |
| 15 | −18.121 | 0.20 | | |
| 16 | 12.026 | 1.20 | 1.80440 | 39.6 |
| 17 | 8.972 | 6.00 | 1.43385 | 95.2 |
| 18 | −23.203 | 0.90 | 1.60311 | 60.6 |
| 19 | 19.497 | 0.20 | | |
| 20 | 6.568 | 5.00 | 1.49782 | 82.5 |
| 21 | −33.082 | 2.50 | 1.77250 | 49.6 |
| 22 | 4.005 | 3.00 | | |

TABLE 3-continued

| | [Specifications] | | | |
|---|---|---|---|---|
| 23 | −4.235 | 2.00 | 1.75500 | 52.3 |
| 24 | 8.775 | 3.30 | 1.84666 | 23.8 |
| 25 | −10.282 | | | |

| Immersion Temp. | Variable Distance $d_H$ |
|---|---|
| 23° C. | 1.14 |
| 30° C. | 1.00 |
| 37° C. | 0.83 |

Values for respective conditional expressions (1), (2), (3) and (5) are shown below.
(1): the left side=0.42
(2): the left side=−0.34
(3): |f/f3|=0.15
(5): |f/fb|=0.04

Figure 8:
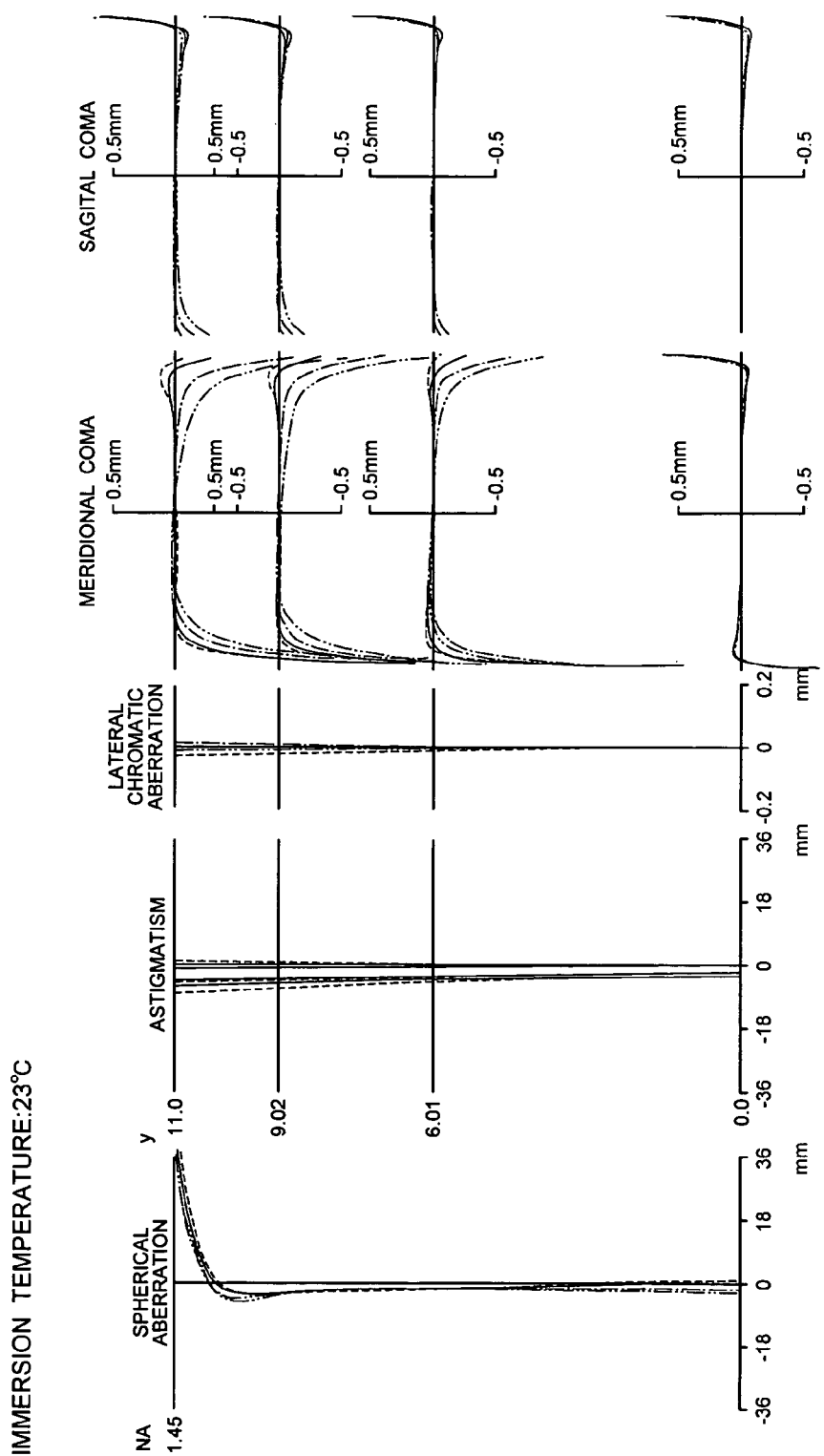
FIG. 8 is graphs showing various aberrations of the immersion microscope objective lens 40 according to Example 2 of the present invention (immersion liquid: 23° C.).
Figure 9:
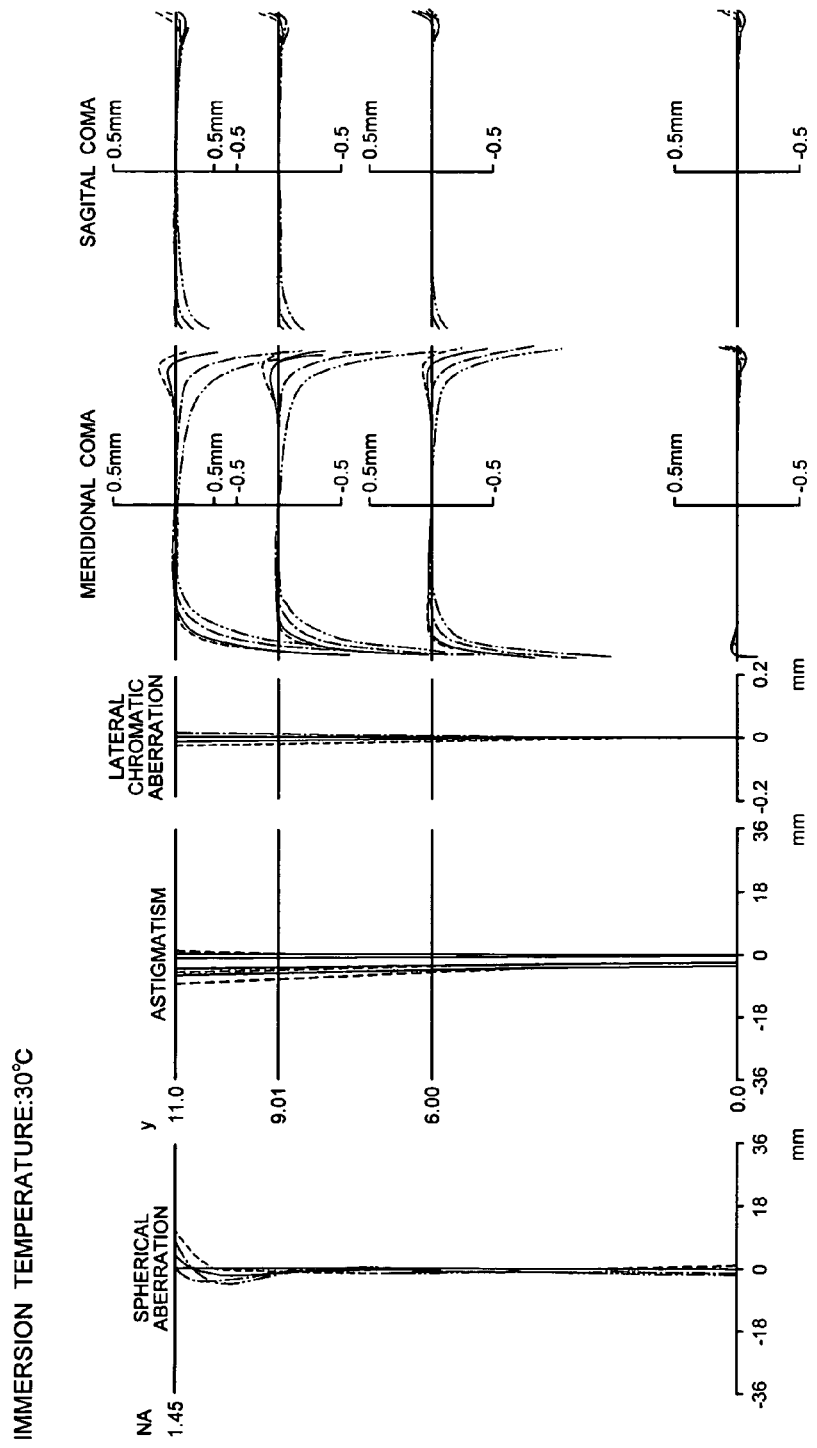
FIG. 9 is graphs showing various aberrations of the immersion microscope objective lens 40 according to Example 2 of the present invention (immersion liquid: 30° C.).
Figure 10:
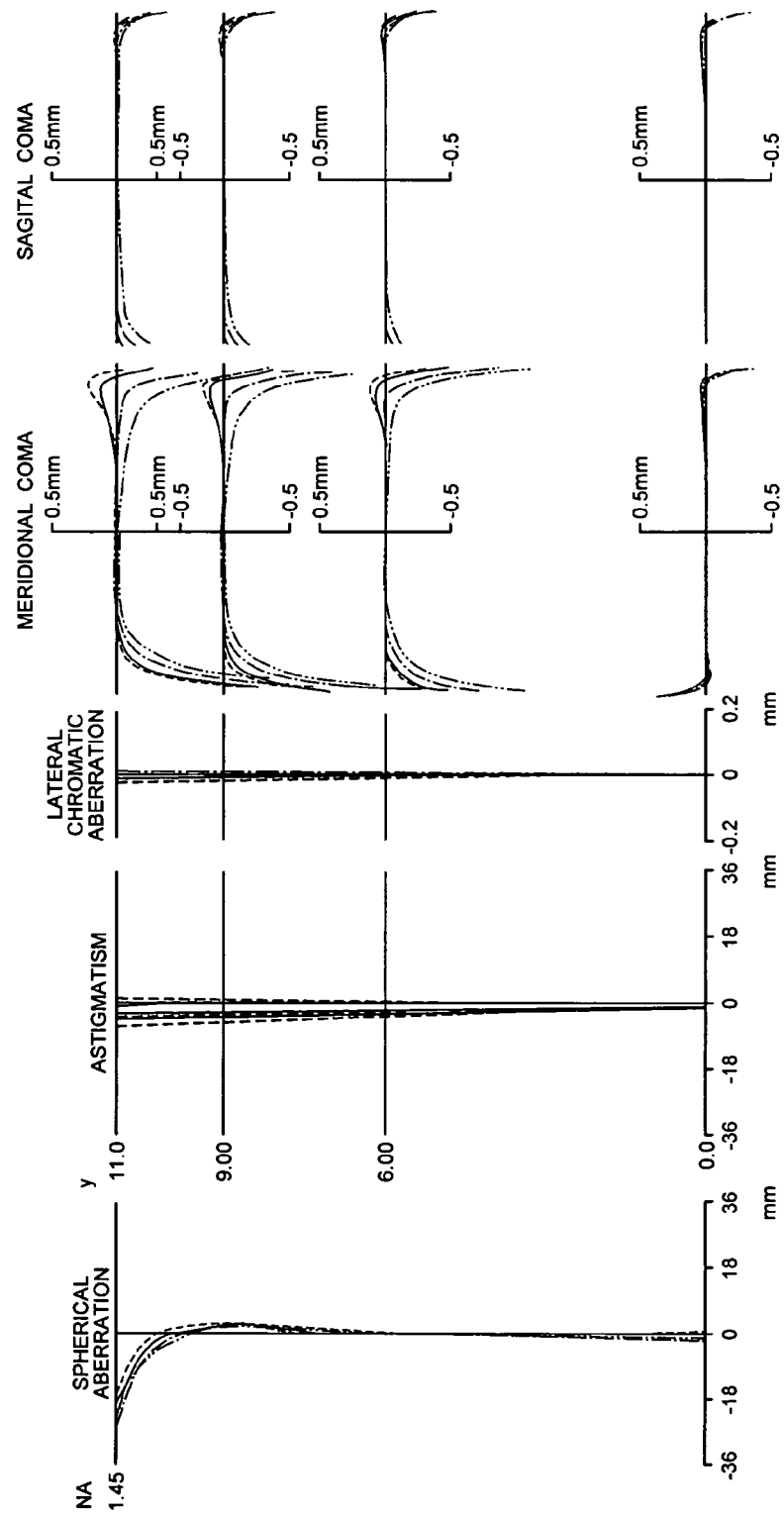
FIG. 10 is graphs showing various aberrations of the immersion microscope objective lens 40 according to Example 2 of the present invention (immersion liquid: 37° C.).

FIGS. 8 to 10 are graphs showing various aberrations of the immersion microscope objective lens 40 according to Example 2 of the present invention on the basis of the lens data shown in Table 3. FIGS. 8 to 10 are similar to FIGS. 4 to 6, so a supplementary explanation is omitted.

As is apparent from the graphs shown in FIGS. 8 to 10 and the lens data listed in Table 3, the immersion microscope objective lens 40 according to Example 2 corrects well various aberrations over the temperature range (23° C. to 37° C.) of the immersion liquid 10B. Accordingly, an object (sample) can be observed in a preferable aberration state by using the immersion microscope objective lens 40 with a total internal reflection fluorescence microscope (TIRFM) (about 37° C.) as well as with an ordinary microscope (about 23° C.). Moreover, even if a fabrication error is exist in the cover glass 10A with the thickness of dB, the object (sample) can be observed in a preferable aberration state.

Furthermore, in the immersion microscope objective lens 40 according to Example 2 of the present invention, since the numerical aperture NA can be made larger than 1.45 with using an ordinary oil as an immersion liquid 10B, refractive index of the object is not limited to nd=1.33 to 1.38, even if refractive index is nd=1.45, an observation with a total internal reflection fluorescence microscope (TIRFM) is possible. Moreover, there is an advantage that by making a numerical aperture NA larger than 1.45, an area of incident ray of a total internal reflection illumination can be expanded. When the immersion microscope objective lens 40 is used for an ordinary microscope observation, it becomes possible to carry out an observation with high resolution by means of a high numerical aperture. Since an ordinary oil is used as an immersion liquid 10B, a clear object (sample) image with little noise component caused by autofluorescence of the immersion liquid 10B can be observed.

VARIATION EXAMPLE

In the first lens group G1 according to the above-described examples, although a positive meniscus lens and three (or two) cemented lenses are disposed to the image side of the most object side cemented lens (cemented lens (11, 12) in FIG. 1 or cemented lens (41, 42) in FIG. 7), the present invention is not limited to this construction. The number of the cemented (positive) lens disposed to the image side of the most object side cemented lens may be four or more. When two or more cemented positive lenses are included to the image side of the most object side cemented lens, the present invention can be applied. The positive meniscus lens may be omitted or instead thereof, another lens can be disposed.

In the above-described examples, although a construction that the second lens group G2 includes one (or two) cemented lens is explained, the present invention is not limited to this. Even if the second lens group G2 includes three or more cemented lenses, the present invention can be applied.

In the above-described examples, although an example that the numerical aperture NA of the immersion microscope objective lens is 1.5 is explained (Tables 1 and 3), the present invention is not limited to this. When the numerical aperture NA is larger than 1.45, the present invention is applicable.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An immersion microscope objective lens comprising, in order from an object:
   a first lens group;
   a second lens group; and
   a third lens group,
   the first lens group including a first cemented lens constructed by a plano-convex lens having a plane surface facing to the object cemented with a meniscus lens having a convex surface facing to an image, and two or more cemented positive lenses disposed to the image side of the first cemented lens,
   the second lens group including one or more cemented lens,
   the third lens group including, in order from the object side, a cemented meniscus lens having a strong concave surface facing to the image, and a cemented meniscus lens having a strong concave surface facing to the object, and
   the following conditional expressions being satisfied:

$$\{|r_1|^2 - (|r_1| - d_1)^2\}^{1/2} - [5.13 \times (d_A - d_B) + 0.775] > 0$$

$$|r_1| + 16.67 \times (n_1 - n_2)/n_1 n_2 < 0$$

$$0.10 < |f/f_3| < 0.16$$

where $r_1$ denotes a radius of curvature of a cemented surface between the plano-convex lens and the meniscus lens in the first lens group, $d_1$ denotes a thickness along the optical axis of the plano-convex lens, $d_A$ denotes a distance between the plane surface of the plano-convex lens and the object plane, $d_B$ denotes a thickness of a cover glass arranged between the plane surface and the object plane, $n_1$ denotes refractive index of the plano-convex lens, $n_2$ denotes refractive index of the meniscus lens, f denotes the focal length of the immersion microscope objective lens, and $f_3$ denotes the focal length of the third lens group.

2. The immersion microscope objective lens according to claim 1, wherein the following conditional expression is satisfied:

$$NA \geq 0.965 \times n_0$$

where NA denotes a numerical aperture of the immersion microscope objective lens, and $n_0$ denotes refractive index of the immersion liquid.

3. The immersion microscope objective lens according to claim 1, wherein the second lens group and the third lens group are a correction lens group capable of moving in a body along the optical axis and the following conditional expression is satisfied:

$$|f/fb| \leq 0.2$$

where fb denotes a focal length of the correction lens and f denotes the focal length of the immersion microscope objective lens.

4. The immersion microscope objective lens according to claim 2, wherein the second lens group and the third lens group are a correction lens group capable of moving in a body along the optical axis and the following conditional expression is satisfied:

$$|f/fb| \leq 0.2$$

where fb denotes a focal length of the correction lens and f denotes the focal length of the immersion microscope objective lens.

* * * * *